(12) United States Patent
Disciascio et al.

(10) Patent No.: US 8,725,647 B2
(45) Date of Patent: May 13, 2014

(54) METHOD AND SYSTEM FOR DETERMINING SOFTWARE LICENSE COMPLIANCE

(75) Inventors: David Disciascio, Moon Township, PA (US); Lee B. Bash, Pittsburgh, PA (US); Erika M. Caley, McKeesport, PA (US); Nan Wu, Coraopolis, PA (US)

(73) Assignee: CA, Inc., Islandia, NY (US)

( * ) Notice: Subject to any disclaimer, the term of this patent is extended or adjusted under 35 U.S.C. 154(b) by 609 days.

(21) Appl. No.: 12/057,053

(22) Filed: Mar. 27, 2008

(65) Prior Publication Data
US 2009/0249494 A1    Oct. 1, 2009

(51) Int. Cl.
*G06F 21/00* (2013.01)
*G06Q 20/00* (2012.01)

(52) U.S. Cl.
USPC .......................................... 705/59; 709/220

(58) Field of Classification Search
USPC .......................................... 707/100; 705/59
See application file for complete search history.

(56) References Cited

U.S. PATENT DOCUMENTS

| | | | |
|---|---|---|---|
| 5,260,999 A | 11/1993 | Wyman | |
| 5,671,412 A | 9/1997 | Christiano | |
| 5,680,615 A * | 10/1997 | Marlin et al. | 1/1 |
| 5,689,708 A * | 11/1997 | Regnier et al. | 709/229 |
| 5,708,709 A * | 1/1998 | Rose | 705/59 |
| 5,745,879 A * | 4/1998 | Wyman | 705/1.1 |
| 5,748,896 A * | 5/1998 | Daly et al. | 709/223 |
| 5,752,041 A * | 5/1998 | Fosdick | 717/178 |
| 5,764,887 A * | 6/1998 | Kells et al. | 726/14 |
| 5,771,354 A * | 6/1998 | Crawford | 709/229 |
| 5,778,368 A * | 7/1998 | Hogan et al. | 1/1 |
| 5,809,251 A * | 9/1998 | May et al. | 709/223 |
| 5,813,009 A * | 9/1998 | Johnson et al. | 707/695 |
| 5,845,065 A * | 12/1998 | Conte et al. | 726/31 |
| 5,845,077 A * | 12/1998 | Fawcett | 709/221 |
| 5,848,243 A * | 12/1998 | Kulkarni et al. | 709/224 |
| 5,875,327 A * | 2/1999 | Brandt et al. | 713/1 |
| 5,881,236 A * | 3/1999 | Dickey | 709/221 |
| 5,911,066 A * | 6/1999 | Williams et al. | 719/310 |
| 5,933,601 A * | 8/1999 | Fanshier et al. | 709/223 |
| 6,021,438 A * | 2/2000 | Duvvoori et al. | 709/224 |
| 6,056,786 A | 5/2000 | Rivera et al. | |
| 6,070,190 A * | 5/2000 | Reps et al. | 709/224 |
| 6,073,123 A | 6/2000 | Staley | |
| 6,098,067 A * | 8/2000 | Erickson | 1/1 |
| 6,105,063 A * | 8/2000 | Hayes, Jr. | 709/223 |
| 6,105,066 A * | 8/2000 | Hayes, Jr. | 709/226 |
| 6,105,069 A * | 8/2000 | Franklin et al. | 709/229 |
| 6,108,712 A * | 8/2000 | Hayes, Jr. | 709/246 |
| 6,115,040 A * | 9/2000 | Bladow et al. | 715/741 |

(Continued)

OTHER PUBLICATIONS

Disciascio et al., U.S. Appl. No. 12/057,005, Non-final Office Action dated Apr. 29, 2010.

(Continued)

*Primary Examiner* — Evens J Augustin
(74) *Attorney, Agent, or Firm* — Baker Botts, L.L.P.

(57) ABSTRACT

According to one embodiment, a method includes providing one or more selectable criteria that each characterize a respective software license restriction. One or more selections of the one or more selectable criteria are received. A license metric is generated. The license metric corresponds to one or more selections of the one or more selectable criteria. A total number of instances of one or more software products is determined using the generated license metric.

26 Claims, 5 Drawing Sheets

(56) References Cited

U.S. PATENT DOCUMENTS

| | | | |
|---|---|---|---|
| 6,151,643 A * | 11/2000 | Cheng et al. | 710/36 |
| 6,158,010 A * | 12/2000 | Moriconi et al. | 726/1 |
| 6,175,363 B1 * | 1/2001 | Williams et al. | 715/746 |
| 6,175,832 B1 * | 1/2001 | Luzzi et al. | 1/1 |
| 6,182,142 B1 * | 1/2001 | Win et al. | 709/229 |
| 6,189,051 B1 * | 2/2001 | Oh et al. | 717/175 |
| 6,189,146 B1 | 2/2001 | Misra et al. | |
| 6,192,414 B1 * | 2/2001 | Horn | 709/239 |
| 6,195,432 B1 * | 2/2001 | Takahashi et al. | 380/277 |
| 6,202,206 B1 * | 3/2001 | Dean et al. | 717/177 |
| 6,728,766 B2 * | 4/2004 | Cox et al. | 709/220 |
| 6,766,305 B1 | 7/2004 | Fucarile et al. | |
| 6,810,389 B1 | 10/2004 | Meyer | |
| 6,920,567 B1 * | 7/2005 | Doherty et al. | 726/22 |
| 6,948,168 B1 * | 9/2005 | Kuprionas | 717/178 |
| 7,092,953 B1 * | 8/2006 | Haynes | 705/51 |
| 2001/0013024 A1 | 8/2001 | Takahashi et al. | |
| 2002/0091645 A1 * | 7/2002 | Tohyama | 705/59 |
| 2002/0107809 A1 * | 8/2002 | Biddle et al. | 705/59 |
| 2003/0005135 A1 * | 1/2003 | Inoue et al. | 709/229 |
| 2004/0039916 A1 * | 2/2004 | Aldis et al. | 713/177 |
| 2005/0010532 A1 * | 1/2005 | Garibay et al. | 705/59 |
| 2006/0059099 A1 * | 3/2006 | Ronning et al. | 705/59 |
| 2006/0059561 A1 * | 3/2006 | Ronning et al. | 726/26 |
| 2006/0155711 A1 | 7/2006 | Jackson et al. | |
| 2006/0184932 A1 | 8/2006 | Burnley et al. | |
| 2006/0200419 A1 | 9/2006 | Cook et al. | |
| 2007/0174205 A1 | 7/2007 | Saito | |
| 2007/0288389 A1 | 12/2007 | Vaughan et al. | |
| 2008/0228513 A1 * | 9/2008 | McMillan et al. | 705/1 |

OTHER PUBLICATIONS

Disciascio et al., U.S. Appl. No. 12/057,005, Response to Non-final Office Action filed Jul. 27, 2010.

Disciascio et al., U.S. Appl. No. 12/057,005, Non-final Office Action dated Oct. 21, 2010.

Disciascio et al., U.S. Appl. No. 12/057,005, Response to Non-final Office Action filed Jan. 21, 2011.

Disciascio et al., U.S. Appl. No. 12/057,005, Final Office Action dated Apr. 27, 2011.

Disciascio et al., U.S. Appl. No. 12/057,005, Response to Final Office Action filed Jun. 23, 2011.

Disciascio et al., U.S. Appl. No. 12/057,005, Advisory Action dated Jul. 8, 2011.

Disciascio et al., U.S. Appl. No. 12/057,005, Notice of Appeal and Pre-Appeal Brief Request for Review filed Jul. 27, 2011.

Disciascio et al., U.S. Appl. No. 12/057,005, Notice of Panel Decision dated Oct. 6, 2011.

Disciascio et al., U.S. Appl. No. 12/057,005, Request for Continued Examination filed Nov. 7, 2011.

Disciascio et al., U.S. Appl. No. 12/057,005, Non-final Office Action dated Dec. 27, 2011.

Disciascio et al., U.S. Appl. No. 12/057,005, Response to Non-final Office Action filed Mar. 27, 2012.

Disciascio et al., U.S. Appl. No. 12/057,005, Final Office Action dated Jun. 21, 2012.

Disciascio et al., U.S. Appl. No. 12/057,005, Response to Final Office Action filed Sep. 14, 2012.

Disciascio et al., U.S. Appl. No. 12/057,005, Notice of Appeal filed Sep. 21, 2012.

Disciascio et al., U.S. Appl. No. 12/057,005, Advisory Action dated Oct. 9, 2012.

Disciascio et al., U.S. Appl. No. 12/057,005, Non-final Office Action dated Nov. 29, 2012.

Disciascio et al., U.S. Appl. No. 12/057,005, Response to Non-final Office Action filed Feb. 28, 2013.

Disciascio et al., U.S. Appl. No. 12/057,005, Notice of Allowance dated Aug. 30, 2013.

Disciascio et al., U.S. Appl. No. 12/057,031, Non-final Office Action dated May 14, 2010.

Disciascio et al., U.S. Appl. No. 12/057,031, Response to Non-final Office Action filed Jul. 21, 2010.

Disciascio et al., U.S. Appl. No. 12/057,031, Final Office Action dated Oct. 12, 2010.

Disciascio et al., U.S. Appl. No. 12/057,031, Response to Final Office Action filed Jan. 12, 2011.

Disciascio et al., U.S. Appl. No. 12/057,031, Advisory Action dated Feb. 4, 2011.

Disciascio et al., U.S. Appl. No. 12/057,031, Request for Continued Examination filed Apr. 11, 2011.

Disciascio et al., U.S. Appl. No. 12/057,031, Non-final Office Action dated Nov. 9, 2012.

Disciascio et al., U.S. Appl. No. 12/057,031, Response to Non-final Office Action filed Feb. 8, 2013.

Disciascio et al., U.S. Appl. No. 12/057,031, Final Office Action dated Jul. 18, 2013.

Disciascio et al., U.S. Appl. No. 12/057,031, Request for Continued Examination dated Oct. 18, 2013.

Disciascio et al., "Method and System for Determining Software License Compliance," U.S. Appl. No. 12/057,005, 32 pages, 5 pages of drawings, filed Mar. 27, 2008.

Disciascio et al., "Method and System for Determining Software License Compliance," U.S. Appl. No. 12/057,031, 32 pages, 5 pages of drawings, filed Mar. 27, 2008.

* cited by examiner

METHOD AND SYSTEM FOR DETERMINING SOFTWARE LICENSE COMPLIANCE

CO-PENDING APPLICATIONS

This application is being filed concurrently with U.S. Ser. No. 12/057,005, entitled "Method and System for Determining Software License Compliance"; and U.S. Ser. No., 12/057,031, entitled "Method and System for Determining Software License Compliance", which are incorporated by reference herein.

TECHNICAL FIELD

This disclosure relates in general to systems using licensed software, and more particularly to a method and system for determining software license compliance.

BACKGROUND

Various software products are licensed to customers, including business entities. The question of software license compliance very often has legal and financial ramifications and thus is of great importance. It is often difficult, however, to determine whether or not a particular system is complaint with the various license(s) associated with its software. For example, software licenses commonly have varying license terms and conditions. In addition, some systems undergo continuous change with respect to the installation or use of software products covered by licenses. The problems associated with determining compliance with various software licenses are sometimes magnified on systems with hundreds or thousands of software applications that may be accessible, in some instances, by even more users.

SUMMARY

According to one embodiment, a method includes providing one or more selectable criteria that each characterize a respective software license restriction. One or more selections of the one or more selectable criteria are received. A license metric is generated. The license metric corresponds to one or more selections of the one or more selectable criteria. A total number of instances of one or more software products is determined using the generated license metric.

Technical advantages of certain embodiments of the present disclosure include an efficient and accurate method for determining software license compliance even under circumstances where software licenses may cover more than one software product and multiple software licenses may cover the same software product. Some embodiments may respond to event triggers by efficiently determining software license compliance only on a corresponding partition of a system. In addition, some embodiments may execute instructions through backend staging at the database level, which may further enhance speed and efficiency.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

The example embodiments of the present disclosure are best understood by referring to FIGS. 1 through 5 of the drawings, like numerals being used for like and corresponding parts of the various drawings.

Figure 1:
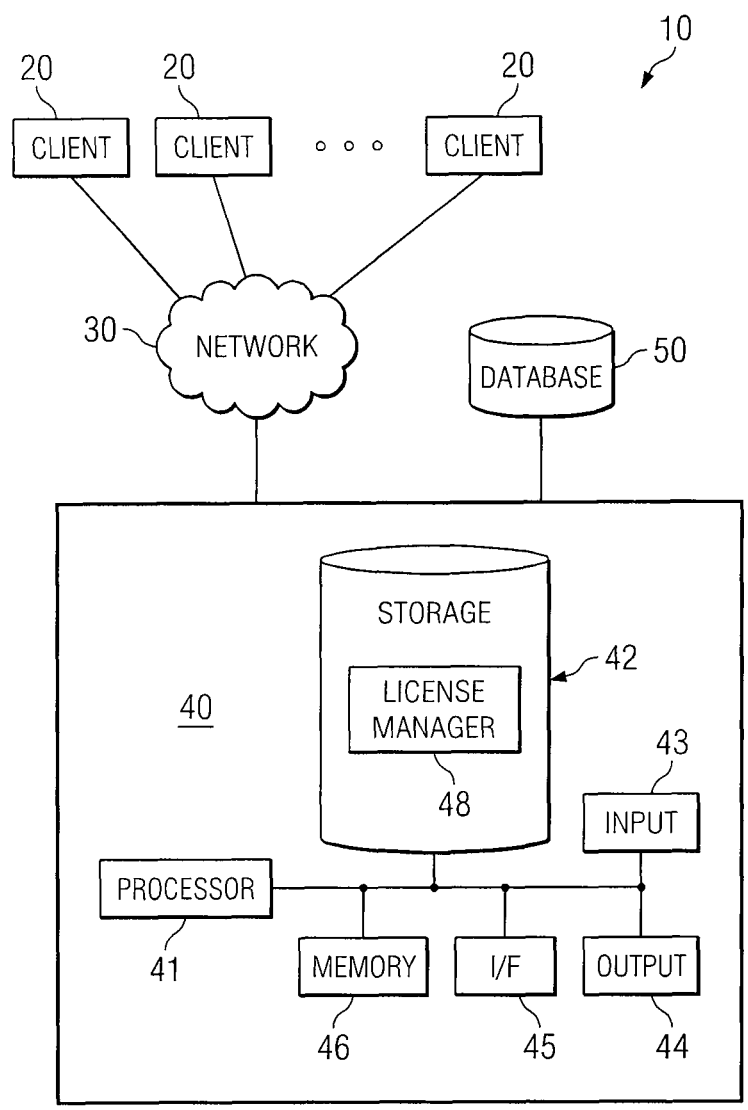
FIG. 1 is a block diagram of a system that generally includes a plurality of clients communicatively coupled through a network to a server according to one embodiment.

FIG. 1 is a block diagram of a system 10 that generally includes a plurality of clients 20 communicatively coupled through a network 30 to a server 40 according to one embodiment. As discussed further below, a license manager 48, which may reside in storage 42 on server 40, generally enables a user to manage, monitor, and/or optimize compliance with the various software licenses associated with system 10. The term "software license" generally refers to any contractual agreement that governs the various rights and restrictions of the software to which the agreement applies. Such rights may include, for example, limited permission to install, store, use, and/or execute a licensed software product.

Client 20 generally refers to any suitable device operable to communicate with server 40 through network 30. Client 20 may execute with any of the well-known MS-DOS, PC-DOS, OS-2, MAC-OS, WINDOWS™, UNIX, or other appropriate operating systems, including future operating systems. Client 20 may include, for example, a personal digital assistant, a computer (e.g., a laptop, a desktop workstation, a server, etc.), a cellular telephone, a mobile handset, or any other device operable to communicate with server 40 through network 30. In this example, clients 20 are generally capable of accessing, installing, and/or executing one or more software products licensed to system 10.

Network 30 generally refers to any interconnecting system capable of transmitting audio, video, signals, data, messages, or any combination of the preceding. Network 30 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. In particular embodiments of the invention, network 30 may transmit information in packet flows; however, information may alternatively be transferred without the use of packets. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Server 40 may include, for example, a file server, a domain name server, a proxy server, a web server, a computer workstation, any combination of the preceding, or any other device(s) operable to manage and/or monitor the use of software licenses by system 10. Server 40 may execute with any of the well-known MS-DOS, PC-DOS, OS-2, MAC-OS, WINDOWS™, UNIX, or other appropriate operating systems, including future operating systems. According to one embodiment, server 40 is a Citrix server capable of hosting licensed software application(s) that are accessible to multiple clients 20.

Database 50 stores data, and facilitates addition, modification, and retrieval of such data. In various embodiments, database 50 may be used to conveniently consolidate all configuration settings associated with license manager 48. In the illustrated embodiment, database 50 resides separate from server 40. For example, database 50 may be stored on a separate dedicated server. In other embodiments, however, database 50 may reside within server 40. In this example, data tables residing within database 50 may be used to store characterizations and corresponding metrics of the various software licenses associated with system 10, as described further below.

In this example, server 40 includes a processor 41, storage device 42, input functionality 43, and output functionality 44, interface 45, and memory 46; however, server 40 may be any appropriate server type. Processor 41 generally refers to any suitable device capable of executing instructions and manipulating data to perform operations for server 40. For example, processor 41 may include any type of central processing unit (CPU).

Storage 42 may refer to any suitable device capable of storing computer-readable data and instructions. Storage 42 may include, for example, logic in the form of software applications, computer memory (e.g., Random Access Memory (RAM) or Read Only Memory (ROM)), mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination and/or multiples of any of the preceding.

Input functionality 43 may refer to any suitable device capable of inputting, selecting, and/or manipulating various data and information. For example, input functionality 43 may include a keyboard, mouse, graphics tablet, joystick, light pen, microphone, scanner, or other suitable input device. Output functionality 44 may refer to any suitable device capable of displaying information to a user. For example, output functionality 44 may include a video/graphical display, a printer, a plotter, or other suitable output device.

Interface 45 may refer to any suitable device capable of receiving input for server 40, sending output from server 40, performing suitable processing of the input or output or both, communicating to other devices, or any combination of the preceding. For example, interface 40 may include appropriate hardware (e.g., modem, network interface card, etc.) and software, including protocol conversion and data processing capabilities, to communicate through a LAN, WAN, or other communication system that allows server 40 to communicate to other devices. Interface 45 may include one or more ports, conversion software, or both.

Memory 46 may refer to any suitable device capable of storing and facilitating retrieval of data. For example, memory 46 may include, for example, logic in the form of software applications, random access memory (RAM), read only memory (ROM), mass storage medium (e.g., a magnetic drive, a disk drive, or optical disk), removable storage medium (e.g., a Compact Disk (CD), a Digital Video Disk (DVD), or flash memory), any combination of the preceding, or any other suitable data storage medium.

Although FIG. 1 illustrates license manager 48 residing in storage 42 of server 40, license manager 48 may alternatively reside within any of a variety of other suitable computer-readable medium, including, for example, memory 46, database 50, removable storage medium (e.g., a Compact Disk (CD), a Digital Video Disk (DVD), or flash memory), one or more of the clients 20, any combination of the preceding, or some other computer-readable medium. In this example, however, server 40 provides a suitable platform for the operation of license manager 48.

In operation, license manager 48 generally enables a user to manage, monitor, and/or optimize compliance with the various software licenses associated with system 10, which licenses generally govern the use of software running on system 10. For example, software licenses may restrict use of the licensed software to particular hardware (e.g., a specified list of clients 20, a particular type of client 20, clients 20 located at a particular site, any combination of the preceding, or some other hardware constraint). Some licenses may have user restrictions (e.g., the license may restrict the number of users, the types of users, specify users by name or department, etc.). One example method for characterizing these and various other license rights and restrictions are described further below with reference to FIG. 2.

Figure 2:
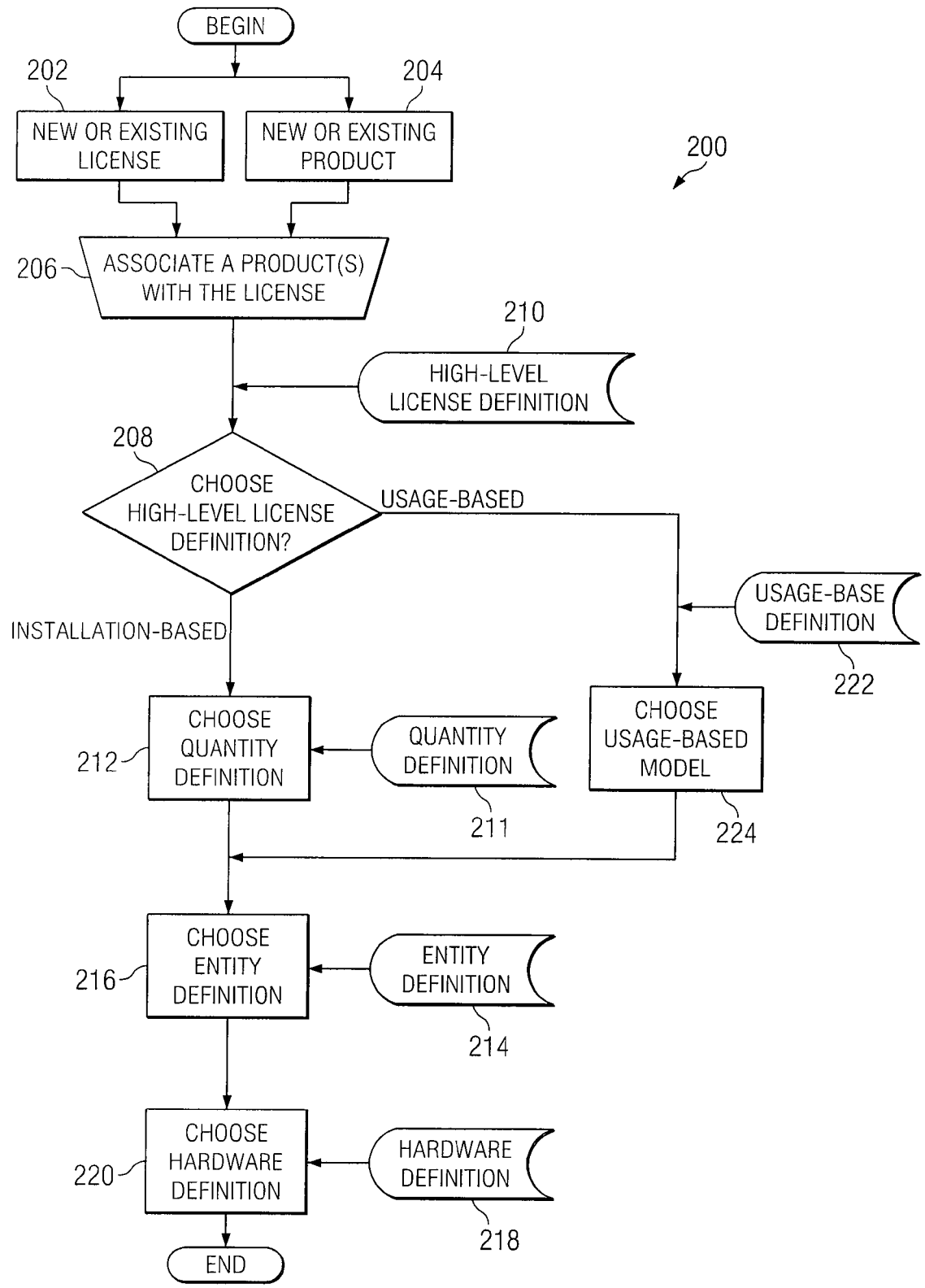
FIG. 2 is a flowchart illustrating an example method for characterizing the software licenses and establishing corresponding license metrics for the system of FIG. 1 according to one embodiment.

FIG. 2 is a flowchart 200 illustrating an example method for characterizing the software licenses of system 10 and establishing corresponding license metrics according to one embodiment. In this example, license manger 48 generally facilitates the characterization of license rights and restrictions by presenting a user a series of menus from a wizard-type graphical user interface (GUI). Prompted by the menus, the user may make selections that best characterize the various rights and restrictions of a software license in question. In some embodiments, the selectable criteria may be hierarchically organized. That is, license manager 48 may enable the characterization of license rights and restrictions according to higher-level criteria and corresponding lower-level criteria, thereby facilitating detailed and accurate license characterization without overwhelming a user with too many options at once.

A completed characterization process generally enables license manager 48 to establish a license metric that may then be used to count software instances based on the actual license rights and restrictions. A software instance generally refers to an event or series of events (e.g., one or more software installations or uses) which decrements a finite software license count by one. Once a license has been fully characterized, license manager 48 may execute instructions based on the established metric to determine if system 10 is in full compliance. In some embodiments, license manager 48 may also determine how system 10 may most efficiently exercise its license rights and suggest modifications accordingly.

In this example, license manager 48 first prompts the user to enter prerequisite information. More specifically, a user is prompted to indicate whether the characterization involves a new or existing license and a new or existing product in acts 202 and 204 respectively. License manager 48 may further prompt the user to name the license/product and provide background information, such as, for example, the termination date of a license. License manager 48 may store this prerequisite information in database 50 or elsewhere for subsequent use.

In act 206, one or more products are associated or dissociated with the license. For example, if a user wishes to add a new product to an existing license, license manager 48 may facilitate a search of the existing license by name and then respond to a user selection by associating the new product with that license (the converse may be true if a user wishes to disassociate or remove a product from a previously entered license). In some embodiments, if the license had been previously characterized and the user indicates no desire to make any characterization changes, flowchart 200 may end. In another example, more than one license may cover the same existing product. If one of the licenses is new and the other had been previously characterized, both the characterized license and the existing product may be selected by the user in a manner similar to that described above. License manager 48 may then prompt the user to characterize the new license. Act 206 may also involve dissociating a product from a license (e.g., in the event of a user mistake).

In this example, license manager 48 prompts the user to choose one or more high-level license characterizations in act 208. According to one embodiment, a data table 210 (residing, for example, in database 50) may provide a list of possible high-level characterizations to the user. For example, license manager 48 may ask the user to indicate if the license is most accurately defined as installation-based, usage-based, some other high-level characterization, or any combination of the preceding. According to one embodiment, a license is considered predominantly installation-based if it considers software instances by their existence or installation on designated hardware devices; and a license is considered predominantly usage-based if it considers software instances according to actual execution or processing.

In this example, if a user characterizes a license as installation-based in act 208, the user is then prompted to characterize the license in terms of corresponding lower-level criteria in acts 212 through 220. For example, the user may be prompted to further characterize the installation-based license in terms of (i) quantity, (ii) entity, and/or (iii) hardware; however, any suitable lower-level criteria may be used. According to one embodiment, license manager 48 retrieves a set of different quantity criteria from a data table 210 in act 212 and then prompts the user to choose from a menu that includes the retrieved options for quantity criteria. In some embodiments, the prompt may be in the form of a statement followed by a drop down menu that helps the user characterize a license. For example, the prompt may state, "One full use of the software license count allows _____. . . . " When the user clicks on the blank, for example, a drop-down menu of quantity criteria may appear. Example quantity criteria may include, for example, a single install, a multiple install, a fixed number of installs, unlimited installs, or some other quantity criteria.

A single install may refer, for example, to a license that permits only one instance of the associated software per client 20. To illustrate, license may be characterized as a fifty-count, single-install license if it permits up to fifty installations of the software on the network 30, but limits each client 20 to no more than one installation. By way of comparison, a license may be characterized as a fifty-count, fixed-number license if it allows up to fifty total installations of the software on the network 30 and also permits multiple installations of the licensed software on a single client 20. An unlimited install may refer to licenses that have no quantitative limits, such as, for example, a license that grants a particular enterprise an infinite number of instances. Multiple installs may characterize license agreements, for example, which allow a single user to install one instance on a primary client 20 and a second instance on a secondary client 20, but nevertheless considers these two installations as a single instance of the licensed software. Thus, a fifty-count, multiple-install license that allowed primary and secondary installations may actually permit up to one hundred installations for a given system 10. If the quantity characterization is not infinite, license manager 48 prompts the user to entity a quantity count and stores this information, for example, within database 50.

In this example, license manager 48 retrieves a set of different entity criteria from a data table 214 in act 216 and then prompts the user to choose from a menu that includes the retrieved options for entity criteria. In some embodiments, the prompt may be a continuation of the statement formed in part from previous prompts and corresponding answers. For example, the prompt may state, "One full use of the software license count allows <insert quantity criteria> for a(n) _____. . . . " When the user clicks on the blank, for example, a drop-down menu of entity criteria may appear. Example entity criteria may include contact, location, organization, enterprise, some other entity criteria, or any combination of the preceding.

A contact entity may apply, for example, to a license that restricts installations to named users or user categories (e.g., an administrator). A site entity may apply, for example, to a restriction limiting installations to a specified geographic location. An organization entity may characterize a license restriction that limits installations to a particular organization, such as, for example, a research and development division within a company. In a broader sense, an enterprise entity may limit, for example, license installations to a particular company. License manager 48 may prompt the user to enter specific information corresponding to the particular entity or entities chosen. This information may later be used to manage, monitor, and/or optimize compliance with the software license(s) in question.

In this example, license manager 48 retrieves a set of different hardware criteria from a data table 218 in act 220 and then prompts the user to choose from a menu that includes the retrieved options for hardware criteria. In some embodiments, the prompt may be a continuation of the statement formed in part from previous prompts and corresponding answers. For example, the prompt may state, "One full use of the software license count allows <insert quantity criteria> for a(n) <insert entity criteria> that is a(n) _____. . . . " When the user clicks on the blank, for example, a drop-down menu of hardware criteria may appear. Any suitable hardware criteria may be used.

For example, a user may select a particular set of clients 20 in accordance with a license restriction. Other license restrictions may limit installations to a particular type or types of hardware, such as, for example, computers with either single or double processors. Some multiple-install licenses may restrict each installation instance, for example, to particular type of primary computer (e.g., a desktop) and a particular type of secondary computer (e.g., a laptop). Under such circumstances, there may be no need for the user to manage primary-to-secondary relationships. Instead, license manager 48 may detect the relationship based on certain criteria (e.g., an installation on both a desktop and a laptop by the same user, under the example above, would decrement the number of available license instances by one).

In some embodiments, the selection of any hardware criteria by a user may be combined with the user's pervious selections to form a sentence that summarizes the license characterization. For example, such a summary statement may have the following form: "One full use of the software license count allows <insert quantity criteria> for a(n) <insert entity criteria> that is a(n) <insert hardware criteria>." Thus, in some embodiments, license manager 48 may be capable of creating a single sentence, based at least partially on user selections of various license characterization criteria, that succinctly and accurately summarizes a software license based. Some embodiments may summarize the user's characterization using alternative visualizations. For example, if the user did not select particular hardware criteria, that portion of the summary statement may be excluded. In addition, the user's selections may be displayed in tabular or tree form as opposed to a sentence containing the selections.

License manager 48 may extract an instance count metric from the user selections embedded in the summary sentence, thereby enabling determinations of license compliance. In addition, the user summary may be used for quick reference later to ascertain whether or not the particular license is correctly characterized by license manager 48.

Referring back to act 208, if a user characterizes a license at a higher-level as usage-based, in this example, the user is then prompted to further characterize the license in terms of corresponding lower-level criteria in acts 222, 216, and 220. As mentioned previously, a license may be considered usage-based if it mainly considers software instances according to actual execution or processing.

In this example, license manager 48 retrieves a set of different usage-based models from a data table 222 in act 224 and then prompts the user to choose from a menu that includes the retrieved options. Example usage-based models include (i) user oriented, (ii) pay-per-use, (iii) value oriented, (iv) concurrent use, some other suitable usage-based model, or any combination of the preceding.

A usage-based license may be further defined as having a user-oriented model if the potential to use or access the application by a user reduces the available instance count by one. In other words, the license count is based on the number of licensed users, even if such licensed users are not currently accessing the licensed software.

A pay-per-use model may apply to a usage-based license if usage is recorded and the user is billed for the amount of usage. The licensing metrics could include, for example, the number of uses of the software or the amount of time the software was accessed.

A value-oriented model may apply to a usage-based license if some value important to the software application is used as the metric for the license. Such license characterization may apply, for example, to software that records the number of transactions executed by a user of the licensed software, the number of units sold as a result of a transaction related to the licensed software, the number of documents managed by the licensed software, etc.

A usage-based license may be further defined as having a concurrent-use model if, for example, it counts the number of software instances at any given moment by the number of clients 20 concurrently using or accessing the software. To illustrate, a Citrix server 40 may be capable of hosting a word processing application that is executable by multiple clients 20 at the same time. A usage-based license may specify how many instances of the word processing application the multiple clients 20 are allowed to run at any given time. Under such a characterization, a single use or access of the licensed software application may effectively reduce the number of available license instances by one, assuming the license allows only a finite number of instances. Under some concurrent-use license agreements, the actual users of the application can vary over time as long as the total number of users accessing the application at any given time does not exceed the amount granted by the license. However, some other concurrent-use licenses may further restrict the associated entity or hardware base. In fact, such additional entity and hardware restrictions can likewise apply to other usage-based models, including, for example, the usage-based models described above.

In this example, therefore, license manager 48 may further characterize a usage-based license by performing acts substantially analogous to those described above with reference to the characterization acts 216 and 217 of an installation-based license. At some point, license manager 48 may also prompt the user to enter quantity information for a usage-based license in a manner analogous to act 212, though such quantity limitations may apply to permissible uses that may be independent of installations.

The example acts of flowchart 200 may be performed in any suitable order. For example, act 220 may precede act 216. In addition, some alternative embodiments may perform more or fewer acts. For example, in some alternative embodiments, license manager 48 may perform additional acts that enhance user convenience. Assume, for example, that a user finished characterizing a particular license and desired to save a template for future use. If such a template were stored, for example, in database 50, a future characterization could be facilitated by starting with the stored template. In addition, license manager 48 may include a maintenance module that facilitates updating a stored license characterization (e.g., in the event of a software revision, a license renewal, etc.).

The various license characterizations described above may be combined in any suitable manner. Assume, for example, a license is assigned to a single user. Once the user is assigned, all installations on all hardware devices owned by the user are covered. Installations on hardware belonging to other users will not be covered. Such a license may be characterized as having "unlimited quantity" with a named "contact entity" limitation. In addition, some licenses may be characterized as both installation-based and usage-based. For example, a license characterization may require combining metrics regarding installation of the software with remote access rights as defined by usage-based metrics. Thus, some embodiments may include a mixed higher-level criteria with corresponding lower-level criteria that may include fewer or more criteria than those previously described.

As mentioned previously, the characterization process described with reference to FIG. 2 generally enables license manager 48 to establish license metrics that may be used to accurately count software instances in a way that accurately reflects the actual license terms. Table 1 further illustrates example license metrics that may result from some of the license characterizations described with reference to FIG. 2.

TABLE 1

| Example Characterization | Example License Metric |
|---|---|
| Single install | 1 install on a hardware device (each installation counts as a single instance) |
| Single install with specific hardware components | 1 install on a hardware device; and restriction on # of hardware components (matching an installation to the specified hardware counts as a single instance) |
| Multiple install | 1 install on a primary hardware device; and 1 install on a secondary hardware device (matching a user's license installations on both a primary and secondary device counts as an single instance) |

TABLE 1-continued

| Example Characterization | Example License Metric |
|---|---|
| Unlimited install for a contact | Unlimited installs on hardware devices for the named user (assigning the license to a named user counts as a single instance) |
| Concurrent use | 1 user accessing the application (the use or accessing of the application by a user counts as a single instance) |

As illustrated in Table 2, each example characterization has a corresponding example license metric. Each license metric provides examples definitions that license manager 48 may use to count unitary instances for a particular license of system 10. A summation of the unitary instances may be used to determine whether system 10 is in compliance with the license in question. In addition, the supplementary restrictions (e.g., the restriction on # of hardware components of row 2) may also be used to determine whether system 10 is in compliance.

In some embodiments, complications may arise when two or more licenses both cover the same product. For example, a newly acquired software license may cover version 3.0 of a particular software product, but also contain a provision that allows installation of version 2.0 of the same software. A previously acquired license, which has not yet expired, may also cover version 2.0 of the software, in addition to version 1.0 of the same software. In some such embodiments, therefore, the question of license compliance for a particular software product or software version may involve two or more licenses. Table 2 illustrates this example scenario.

TABLE 2

| License | License Count | Software products covered |
|---|---|---|
| License A | 10 | v1.0 |
| | | v2.0 |
| License B | 10 | v2.0 |
| | | v3.0 |

As shown in Table 2, two ten-count licenses cover two respective software products. More specifically, License A covers products v1.0 and v2.0 for an instance count of 10; and License B covers products v2.0 and v3.0 for an instance count of 10. License manager 48 may consider the fact that these licenses are related by product v2.0 and determine compliance accordingly. Table 3 illustrates some permissible count distributions between products v1.0, v2.0, and v3.0 according to these example license terms.

TABLE 3

| v1.0 | v2.0 | v3.0 |
|---|---|---|
| 0 | 20 | 0 |
| 10 | 10 | 0 |
| 5 | 10 | 5 |
| 10 | 0 | 10 |
| 2 | 13 | 5 |

As shown in Table 3, the sum of each row equals twenty. An increase in instance count for any of the cells, therefore, would render the supplemental instance count(s) noncompliant with License A and/or License B. For example, in row one of Table 3, an instance count of twenty for product v2.0 is still in compliance with Licenses A and B because products v1.0 and v2.0 both have an instance count of zero. In row two of Table 3, however, increasing the instance count from ten to twenty for product v2.0 would render the ten supplemental instances noncompliant with the respective ten-count limitations of License A and/or License B. Methods that consider only one product of a license at a time may thus risk inaccurately determining license compliance. More sophisticated methods that consider two or more products of a license at a time may still inaccurately determine license compliance in situations where, as shown above, two or more licenses cover the same product (e.g., such methods may declare system 10 as noncompliant when in fact system 10 is compliant or may alternatively declare compliance when system 10 is in fact not compliant). One example method that may reliably determine license compliance even in situations where two or more licenses may cover the same product is described further with reference to FIGS. 3A through 5.

Figure 3A:
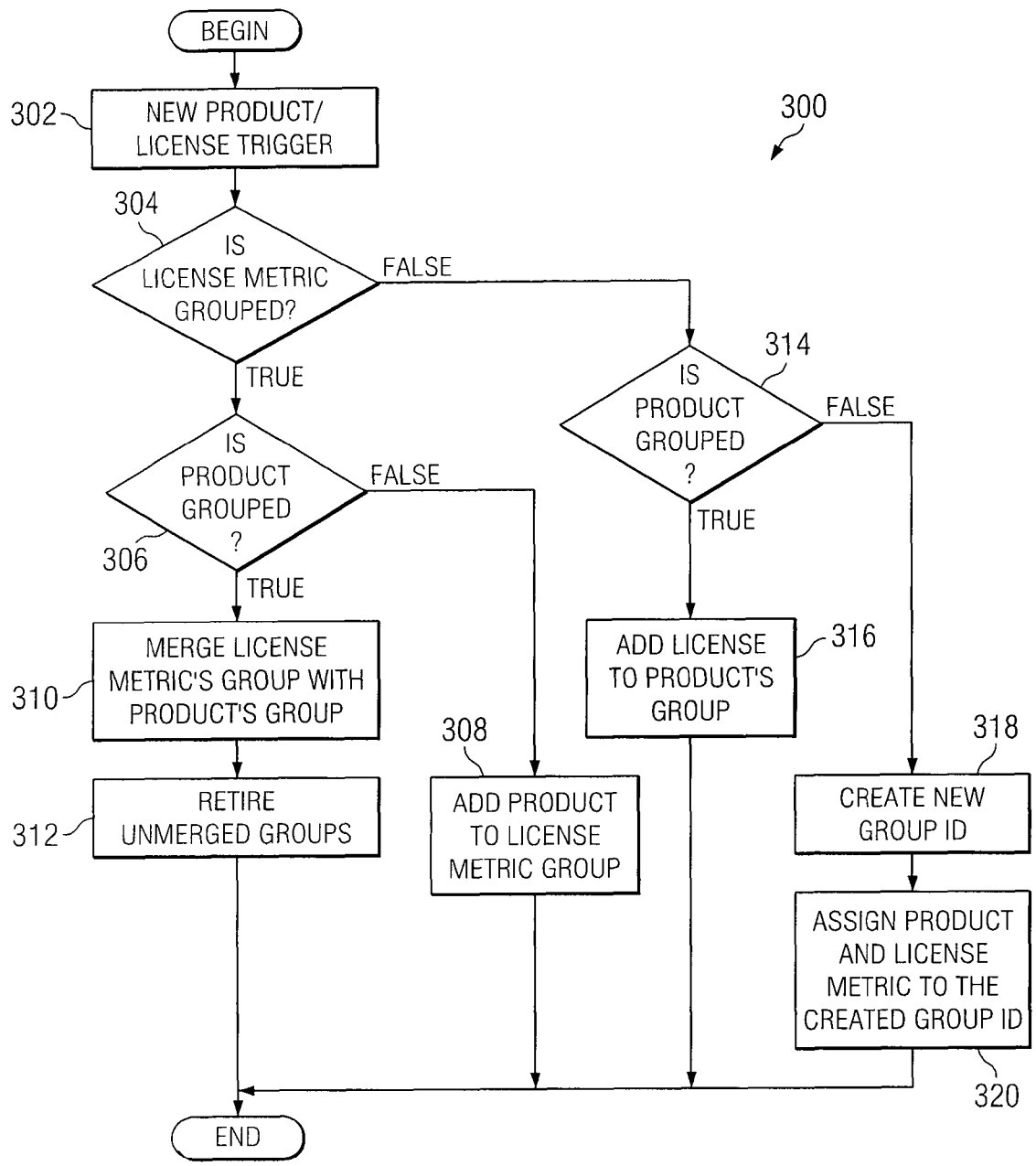
FIGS. 3A and 3B are flowcharts illustrating example methods for merging and splitting, respectively, one or more groups of software licenses and corresponding software products associated with the system of FIG. 1.
Figures 3B, 4:
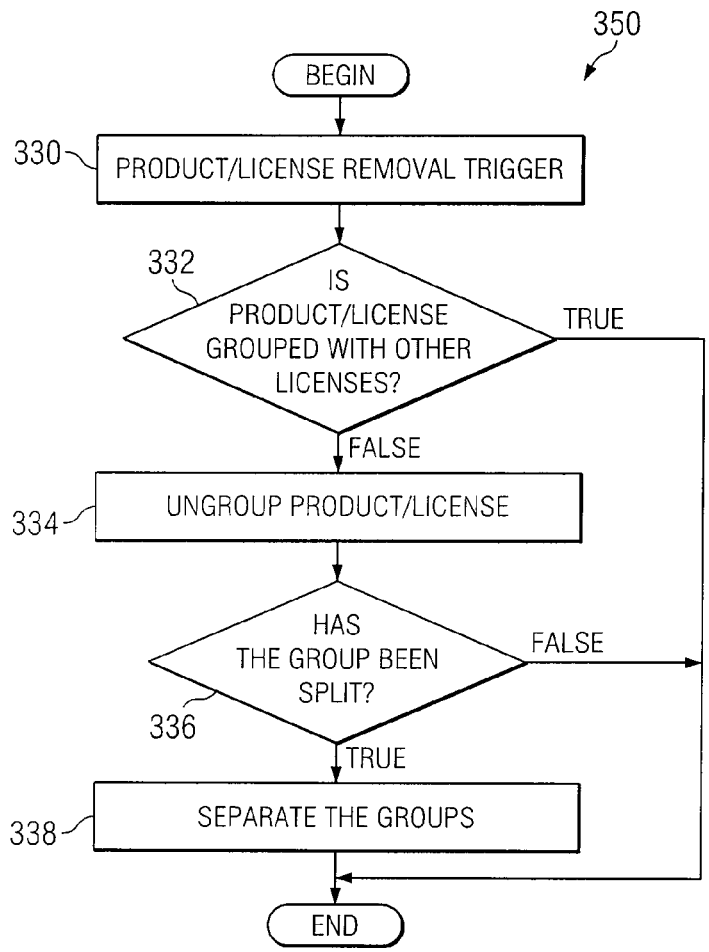
FIG. 4 is an example matrix of data that may be used to describe the coverage of software products by a particular group of licenses that may be formed by the example methods illustrated by FIGS. 3A and 3B.

FIGS. 3A and 3B generally describe example methods for merging and splitting, respectively, one or more groups of software licenses and corresponding software products associated with system 10. The example merging and splitting methods may result in assigning or reassigning respective group identifications (IDs) to at least a subset of the products and license metrics of system 10. In some embodiments, the acts illustrated by FIGS. 3A and 3B may be effected, at least in part, by license manager 48.

Merging generally refers to associating one license metric and corresponding software product(s) with at least one other license metric that has at least one corresponding software product in common. The previous discussion of Table 2 illustrates one example scenario where merging groups of license metrics and corresponding products may be appropriate. More specifically, License B covers one software product in common with License A, namely product v2.0. Licenses A and B may thus be merged by assigning both a common group identification, as explained further below.

Splitting generally refers to disassociating one license metric and corresponding software product(s) from at least one other license metric that previously had at least one corresponding product in common. Assume, for example, License A of Table 2 expired before License B. As a result of the License B expiration, a previously formed group containing Licenses A and B and products v1.0, v2.0, and v3.0 may remove or retire License A and product v1.0 from the group. Splitting might also be a consequence of a user adding or removing a product from a license metric (e.g., by mistake or due to appropriate license maintenance). For example, if a user removed v2.0 from License A, a previously formed group containing Licenses A and B and products v1.0, v2.0, and v3.0 may be split into a first group containing License A and product v1.0 and a second group containing License B and products v2.0 and v3.0.

FIG. 3A is a flowchart 300 illustrating one example method for determining software license compliance for system 10 by merging or grouping licenses together that cover one or more software products in common. In this example, a detected introduction of one or more software licenses and/or software products into system 10 triggers flowchart 300 to begin in act 302. The introduction may be effected, for example through accessing license manager 48 in a manner substantially similar to that described above with reference to FIG. 2 (e.g., a user may interface with license manager 48 to characterize a new license and/or add one or more products to a license). In another example, a detected installation or a detected use of one or more software products on system 10 may trigger flowchart 300 to begin in act 302; and if no license metric is already associated with the one or more software products, for example, an alert may be sent to a user of this fact and flowchart 300 may hold until a license metric is created.

Act 304 involves determining whether or not the introduced license metric is grouped with one or more other license metrics. If the license metric is grouped then act 306 involves determining whether or not the associated product is grouped as well; and if the product is not grouped then the product is added to the license metric's group in act 308 and flowchart 300 ends. If the product is grouped, however, the license metric group and the product group are merged together in act 310; and flowchart 300 then ends after the unmerged group is retired in act 312.

Referring back to act 304, if it is determined that the license metric is not grouped then act 314 involves determining whether are not the product is grouped. If the product is grouped then the license is added to the product's group in act 316 and flowchart 300 ends. If the product is not grouped, however, a new group identification (ID) is created in act 318; and flowchart 300 then ends after the product and license metric are assigned to the group ID created in act 318.

FIG. 3B is a flowchart 350 illustrating one example method for determining software license compliance for system 10 by splitting or dissociating licenses from each other that previously had covered one or more software products in common. In this example, a detected removal of one or more software licenses and/or software products from system 10 triggers flowchart 350 to begin in act 330. The detected removal may be effected, for example by accessing license manager 48 in a manner substantially similar to that described above with reference to FIG. 2 (e.g., a user may interface with license manager 48 to remove a product from a license or to remove a license altogether). In another example, a detected license removal may be effected by a signal timed to correspond to the expiration of a particular license.

Act 332 involves determining whether or not the removed software product exists on other license metrics or whether the license metric is grouped with one or more other license metrics. If either is true, flowchart 350 ends; otherwise, the product and/or license metric are ungrouped in act 334.

Act 336 involves determining whether or not the ungrouping of act 334 resulted in a group split. If no split occurred, flowchart 350 ends; otherwise, the groups are separated by changing one or more group IDs accordingly in act 338 and then flowchart 350 ends.

In this example, once the licenses of system 10 are fully characterized, corresponding metrics are established for instance counts, and the various groups are established (if any), license manager 48 may perform acts to determine if system 10 is in full compliance. Such acts may include determining the most efficient use of the licenses associated with system 10 in light of real-time installations or uses of software on the system 10. That is, various events (e.g., software installations or uses by users of system 10) may trigger system 10 to update a compliance analysis. The updated compliance analysis may include an engine that determines the best distribution of license (i.e. virtually reassigns licenses) in response to events in order to optimize license rights. One example method that may use the previously discussed license metrics and group IDs as inputs into a compliance analysis is described further with reference to FIGS. 4 through 5.

FIG. 4 is an example matrix 400 that may be used to describe the coverage of software products by a particular group of licenses of system 10. In this example, each row of matrix 400 represents a particular license C, D, E, F, or G; and each column represents a particular product P1, P2, P3, or P4. The particular group composition of licenses C-G and products P1-P4 may be selected, for example, by performing acts substantially similar to that described previously with reference to FIGS. 3A through 3B (e.g., the group composition may be at least partially determined by license manager 48).

In this example, the value of each matrix cell is 1 if the license covers the product and 0 if the license does not cover the product (e.g., License C covers products P1 and P2, License D covers products P2 and P3, etc.). The bottom row 402 of matrix 400 contains cells that represent the total actual instance counts of respective software products P1, P2, P3, or P4 (e.g., system 10 currently has 10 installs/uses of product P1, 75 installs/uses of product P3, etc.). In this example, the total instance counts recorded in bottom row 402 are determined, at least in part, using license metrics established by performing acts substantially similar to those described with reference to FIG. 2; however, the total instance counts may be determined or otherwise provided by any suitable source(s). For example, the total instance counts of system 10 may be first discovered by license manager 48, or some other suitable discovery software, and then counted using the license metrics previously discussed. In addition or in the alternative, a user may provide information pertaining to the total instance counts.

The rightmost column 404 of matrix 400 contains cells that represent the maximum number of license counts/instances granted by respective licenses C, D, E, F, G (e.g., License C grants a maximum of 10 license counts/instances that may be distributed between products P1 and P2, License E grants a maximum of 105 license counts/instances that may be distributed between products P2 and P3, etc.). In this example, if a particular license grants an unlimited number of license counts/instances then the number assigned to column 404 is set to equal the number of actual software instances (e.g., installations/uses) on system 10 that are covered by the unlimited license. If License E granted an unlimited license, for example, the corresponding 02 license count of column 404 may be set to 105, which equals a summation of the total instance counts for P3 and P4.

If a license covers products with particular criteria (e.g., the license metric includes hardware criteria) then each combination of the criteria may be treated as a pseudo product in the matrix. For example, assume a particular license includes two hardware criteria X and Y. A particular instance of the software product may fall under the following four possible combinations of hardware criteria X and Y: (i) meets both X and Y, (ii) meets X but not Y, (iii) meets Y but not X, and (iv) does not meet either X or Y. Thus, for n criteria there will be $2^n$ criteria combinations.

A determination of license compliance may be executed by assigning a number on each 1-valued cell (i.e. the nonempty cells of matrix 400, excluding row 402 and column 404) such that the sum of each row is less than or equal to the corresponding number of column 404; and the sum of each column is less than or equal to the corresponding number of row 402. If no matrix combination exists to satisfy these conditions, the group may have a noncompliance issue. For example, excessive software instances may create a noncompliance issue (e.g., excessive uses/installs of products P1, P2, P3, and/or P4). If perfect symmetry may be achieved then the group may be in optimal compliance (i.e. the summation of each row and column equals the corresponding number of column 404 and row 402, respectively). An example method of determining license compliance for the entire system 10 using, at least in part, a series of matrices similar to matrix 400 is described further below with reference to FIG. 5.

Figure 5:
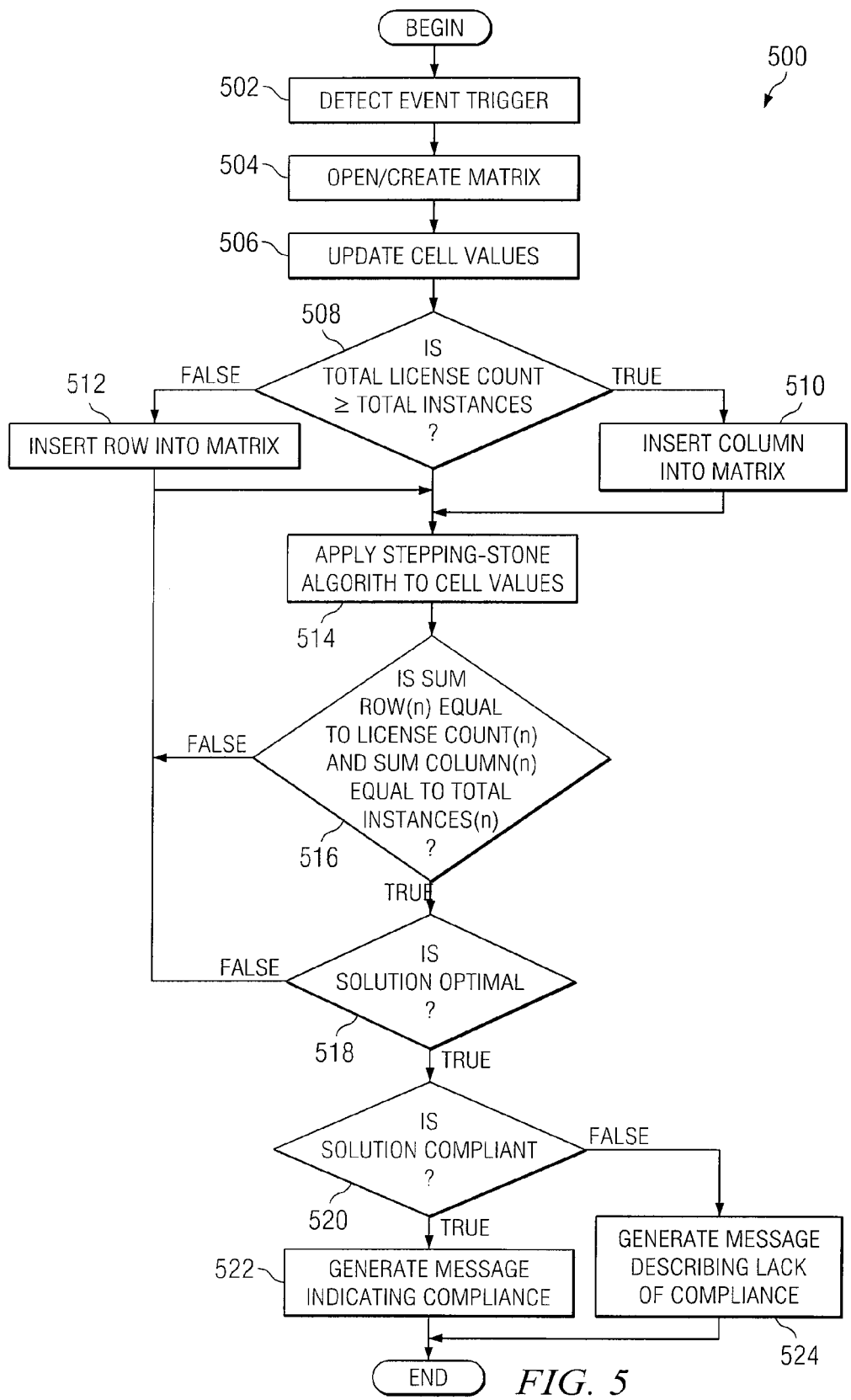
FIG. 5 is a flowchart illustrating one example method for determining software license compliance for the system of FIG. 1 that includes solving one or more matrices substantially similar to the matrix of FIG. 4.

FIG. 5 is a flowchart 500 illustrating one example method for determining software license compliance for system 10 that includes solving one or more matrices substantially similar to matrix 400 illustrated in FIG. 4. In this example, flowchart 500 generally includes the following acts: responding to a trigger by retrieving data in the form of a matrix; performing any applicable updates to the data; determining optimal matrix resolution and license compliance by balancing the matrix using a stair-stepping algorithm. In some embodiments, the acts illustrated by FIG. 5 may be effected at least partially by license manager 48.

In this example, each matrix is stored as a separate table within database 50 and indexed by an associated group ID; however, any suitable format, storage location, and/or indexing may be used. For example, in some alternative embodiments a single matrix may be used to describe the entire coverage of software products by all the licenses of system 10; and some other alternative embodiments may include, for example, one or more matrices that describe the coverage of software products for multiple license groups of system 10.

Flowchart generally begins by detecting an event trigger in act 502. An event trigger generally refers to any signal or data modification that indicates the occurrence of, or is generated in response to, one or more particular events. Such events may include, for example, any combination or multiple of the following: the generation of a new license group (e.g., a new group ID or data, such as a table entry, indicating the creation of a new license group ID may be detected); the removal of an old license group (e.g., the deletion of a preexisting group ID or data, such as a table entry, indicating the same may be detected); the introduction of new licenses or products (e.g., a new license and/or product may be added to a particular group ID); and/or any other event that may affect a determination of software license compliance.

The event triggers may be detected and/or generated at any suitable level. For example, the event triggers may be detected and/or generated towards the front end of system 10 (e.g., within clients 20) using SQL queries. In this example, however, the event triggers are generated and/or detected more toward the back end of system 10 (e.g., a database level). For example, one or more data table entries within database 50 may be set to indicate the occurrence of an event, which may then be detected, for example, using native sort procedures. In addition, each event trigger may correspond to a particular partition of system 10 (e.g., a partition may include one or more groups of licenses and products indexed by respective group IDs). In this manner, the question of license compliance may be efficiently limited to the relevant portion(s) of system 10 where one or more changes occurred.

In act 504, data corresponding to the detected event trigger is accessed and/or generated. In this example, if the detected event trigger is tied to a particular group ID, one or more matrices corresponding to that group ID are accessed; otherwise a new matrix or data table and corresponding group ID may be generated by performing acts substantially similar to those illustrated by FIG. 3A.

The accessed or generated data may then be updated in act 506. For example, the instance data (e.g., row 402 of matrix 400) may be updated according to the current instance count of system 10 (e.g., the current software installations/uses of system 10). If the accessed or generated data indicates one or more of the licenses are unlimited, the corresponding "license count" data may be updated with the current instance count that the license covers. In addition, some embodiments may change any zeros (e.g., the zero values of matrix 400) to an arbitrary big number (e.g., 1000, 10,000 etc.) for normalization and/or analytical purposes.

Act 508 involves determining whether a summation of the total license counts for the partition under consideration (e.g., a particular license group) is greater than or equal to a summation of total instances. For example, the summation of column 404 in matrix 400 is 157, which is 27 greater than the summation of row 402. If the determination resolves as true (i.e. total license counts≥total instances), a column may be inserted into a corresponding matrix or data table in act 510 (e.g., inserted between the P4 column and column 404 of matrix 400); otherwise a row may be inserted into a corresponding matrix or data table in act 512 (e.g., inserted between the License G row and row 402 of matrix 400).

In this example, a column inserted in act 510 does not necessarily represent a new product or product criteria, but rather serves as a data placeholder that may be used for analytical purposes and thus may be thought of as an "imaginary product." The cell values of the inserted column may be set to any arbitrary big number (e.g., 500, 1000, 10,000 etc.). In some embodiments, the arbitrary number selected for the inserted column may be less than (e.g., half of) the arbitrary number previously selected to replace the zero values, which may, depending on the arbitrary numbers and algorithm(s) used, apply a relative preference to the inserted column for purposes of solving the matrix. The instance count number of the inserted column, however, is set to the previously determined difference between the total license counts and the total instances (e.g., a value of 27 may be stored in a corresponding cell of row 402 after inserting the column into matrix 400). In other words, the matrix may be solved as if the "imaginary product" had an instance count that made up the calculated difference between the total license counts and the total instances.

Similarly, in this example, a row inserted in act 512 does not necessarily represent a new software license, but rather serves as a data placeholder that may be used for analytical purposes and thus may be thought of as an "imaginary license." The cell values of the inserted row may be set to any arbitrary big number (e.g., 500, 1000, 10,000 etc.). In some embodiments, the arbitrary number selected for the inserted row may be less than (e.g., half of) the arbitrary number previously selected to replace the zero values, which may, depending on the arbitrary numbers and algorithm(s) used, treat the inserted column with relative preference for purposes of solving the matrix. The license count number of the inserted column, however, is set to the absolute value of the previously determined difference between the total license counts and the total instances. In other words, the matrix may be solved as if the "imaginary license" granted an additional number of licenses that made up the calculated difference between the total license counts and the total instances.

In this example, after the matrix or data table is updated with an inserted row or column according to acts 510 or 512, respectively, one or more possible matrix solutions may be tested by changing one or more cell values in act 514. In this example, a stepping-stone algorithm is applied to the cell values of a matrix or data table; however, any suitable algorithm(s) and/or matrix resolution techniques may be used, including, for example, linear algebra techniques that may or may not apply trial and error principles.

Referring to matrix 400, an example stepping-stone process of assigning values to a matrix or data table may commence, for example, in the upper left-most cell corresponding to License C and product P1. A comparison may be made between the corresponding license count and instance count in column 404 and row 202, respectively, and the lesser value of the two may be entered, which is ten in this case because they both are equal. Because there are no instance counts left to consider for P1, all the remaining P1 values may be set to zero; and the same is true in this case for the remaining License C values, as entering a value of ten accounts for all the license counts granted by License C. The same process may then be applied, for example, to the next closest cell with the lowest original value, which in this case is the cell corresponding to License D and product P2. Again, a value of fifteen may be entered here because the total instance counts and the license counts are both fifteen. The remaining cells of License D and product P2 may be filled in with zeros as before. The procedure may next consider, for example, the cell corresponding to License E and product P3. A value of seventy-five may be entered and the remainder of column P3 may be filled with zeros. The general process may continue, for example, until the entire matrix is updated with values or it is determined that a solution is impossible with the values already entered. This illustrated implementation is for example purposes only and not intended to limit the scope of the present disclosure. In particular, a stepping-stone algorithm and/or any of a variety of other algorithms may be implemented in any of a variety of alternative ways.

At some point, a determination is made in act 516 regarding whether the sum of a particular $n^{th}$ row equals the corresponding $n^{th}$ license count and/or whether the sum of the $n^{th}$ column is equal to the total $n^{th}$ instances. In some embodiments, the determination of act 516 may be effected, for example, before all the cell values of a matrix or data table are modified and/or otherwise considered in act 514. For example, the determination of act 516 may occur on a row-by-row and/or a column-by-column basis. In some other embodiments, the determination of act 516 may occur, for example, after every cell of a matrix is modified and or otherwise considered in act 514.

Act 518 involves determining whether or not the matrix solution is optimal. The term matrix solution generally refers to the arrangement and values of the data used to determine license compliance (e.g., the cell values entered into matrix 400 in act 514). In this example, a solution is considered optimal if the following three conditions are satisfied: (i) the sum of each license row of a matrix equals the corresponding license count number, (ii) the sum of each product column equals the corresponding total instance count, and (iii) zeros are assigned to all of the cells originally having a value of zero prior to the update of act 516 (i.e. the original zero-value cells indicating that a particular license did not cover a particular product). The determination of act 518 may or may not take into account the row or column inserted in act 510 or 512, respectively. If the solution is not considered optimal then flowchart 500 loops back to act 514. If the solution is considered optimal, however, then flowchart 500 proceeds with act 520.

Act 520 involves determining whether the solution is compliant. If the solution is compliant, a message is generated to this effect in act 522 and flowchart 500 ends; otherwise a message describing the noncompliance is generated in act 524 and then flowchart 500 ends. In some embodiments, a solution may be considered compliant if the portion of system 10 under consideration (e.g., the group of licenses and corresponding products represented by a particular matrix or data table) satisfies any combination of the following conditions: legal compliance with all the rights and restrictions of the licenses described by a matrix or data table (e.g., no unlicensed instances), and/or utilization of every available license count.

In this example, the determination of license compliance may be quickly determined, for example, with reference to an optimized matrix (i.e. a matrix having an optimal solution as determined by act 518). An optimized matrix having nonzero values assigned to an inserted row (i.e. the row inserted in act 512) may indicate the existence of non-licensed instances of one or more software products. In some embodiments, at least a portion of these nonzero cell values may actually provide the number of additional license counts needed to render compliant a corresponding software product of system 10 (i.e. a software license having specific criteria may be described in a matrix or data table by multiple columns, as previously described, though the corresponding values in an inserted row may or may not be cumulative when considering the number of additional licenses needed). The message generated in act 524 may describe noncompliance, therefore, in terms of how many additional licenses are needed, if any, for each software product in order to render system 10 compliant. The message may be stored and/or sent to a user or some other entity, thereby altering the user/entity of the potentially serious noncompliant condition.

A matrix or data table having nonzero values in a column inserted by act 510 may indicate the existence of underutilized license counts. The total number of underutilized license counts may be extracted, for example, from the cell value in the total instances row of the column inserted in act 510. If one or more licenses of the license group covers only one particular product, the corresponding cell value(s) in the inserted column may indicate how many additional instances of that particular product may be applied to system 10. Depending on how full compliance is defined, the message generated in act 522 and/or 524 may describe compliance or noncompliance in terms of unused license counts. The number(s) of unused license counts may be enable projective planning and/or instigate future arrangements in accordance with expectations of instance expansion.

In some embodiments, the message(s) generated in acts 522 and 524 may be communicated to a user or some other entity (e.g., client 20, server 40, database 50). For example, the message(s) may be communicated in the form of an electronic signal, an email, and/or as a data that may be used to generate a video display. In some embodiments, the messages generated in acts 522 and 524 may be concatenated with other messages that may be generated as a result executing acts substantially similar to flowchart 500 for other license groups. In this manner, a user may receive only one message after system 10 undergoes a series of instance count modifications.

Thus, the example embodiments described above provide a method and system for determining software license compliance. These methods may be used defensively or offensively. For example, a business may want to manage license compliance for a particular system including thousands of clients 20 accessible by at least as many users. In addition, a software company may wish to determine whether or not a customer or a particular system is abiding by the terms and conditions granted by one or more software licenses and execute particular acts accordingly.

As described above, various embodiments may efficiently consider only a partition of a system at a time, as directed by a detected event or an event trigger, and thus may minimize computing bandwidth and presence on a system 10. In addition, some embodiments may execute instructions through backend staging at the database level, which may further enhance speed and efficiency.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
providing, by a server, one or more selectable criteria, to a licensee, wherein the one or more selectable criteria each characterize a respective software license restriction of an executed software license governing the use of a software product by a plurality of client devices associated with the licensee;
receiving, by the server, one or more selections of the one or more selectable criteria from the licensee;
generating, by the server, a license metric corresponding to the one or more selections of the one or more selectable criteria by the licensee, the license metric identifying a number of instances that the software product may be used by the plurality of client devices associated with the licensee, wherein the number of instances that the software product may be used is governed by a plurality of overlapping licenses executed by the licensee;
determining, by the server and based on the generated license metric, a count of a total number of instances of use of the software product by the plurality of client devices associated with the licensee; and
determining, by the server, if the licensee is in compliance with the plurality of licenses based on a comparison of the total number of instances of use of the software product to the number of instances that the software may be used as governed by the plurality of overlapping licenses executed by the licensee.

2. The method of claim 1, wherein the generated license metric measures the determined total number of instances of the software product based at least partially on a definition selected from the group consisting of:
a single install that considers each instance of the total number of instances according to a single installation of the software product on a respective client;
a multiple install that considers each instance of the total number of instances according to at least first and second installations on respective clients of the software product;
a fixed number of installs that considers each instance of the total number of instances according to installations of the software product independent of whether one or more of the total number of instances are installed on the same client; and
an unlimited install that specifies an unlimited number of instances.

3. The method of claim 1, wherein the one or more selectable criteria are hierarchically organized.

4. The method of claim 1, wherein first and second selectable criteria of the one or more selectable criteria characterize the respective software license restriction as installation-based and usage-based, respectively.

5. The method of claim 1, wherein the one or more selectable criteria are provided in the form of one or more categories selected from the group consisting of:
quantity criteria that control the total number of instances in terms of number;
entity criteria that control the total number of instances in terms of user, location, enterprise, or organization within an enterprise; and
hardware criteria that control the total number of instances in terms of hardware characteristics.

6. The method of claim 1, further comprising generating a description that summarizes each of the one or more selections of the one or more selectable criteria.

7. A non-transitory computer-readable media with instructions being executed by a computer to:
present one or more selectable criteria, to a licensee, wherein the one or more selectable criteria each characterize a respective software license restriction of an executed software license governing the use of a software product by a plurality of client systems associated with the licensee;
receive one or more selections of the one or more selectable criteria from the licensee;
generate a license metric corresponding to the one or more selections of the one or more selectable criteria by the licensee, the license metric identifying a number of instances that the software product may be used by the plurality of client systems associated with the licensee, wherein the number of instances that the software product may be used is governed by a plurality of overlapping licenses executed by the licensee;
determine, based on the generated license metric, a count of a total number of instances of use of the software product by the plurality of client systems associated with the licensee; and
determine if the licensee is in compliance with the plurality of licenses based on a comparison of the total number of instances of use of the software product to the number of instances that the software may be used as governed by the plurality of overlapping licenses executed by the licensee.

8. The non-transitory computer-readable media of claim 7, wherein the generated license metric measures the determined total number of instances of the software product based at least partially on a definition selected from the group consisting of:
a single install that considers each instance of the total number of instances according to a single installation of the software product on a respective client;
a multiple install that considers each instance of the total number of instances according to at least first and second installations on respective clients of the software product;
a fixed number of installs that considers each instance of the total number of instances according to installations of the software product independent of whether one or more of the total number of instances are installed on the same client; and
an unlimited install that specifies an unlimited number of instances.

9. The non-transitory computer-readable media of claim 7, wherein the one or more selectable criteria are hierarchically organized.

10. The non-transitory computer-readable media of claim 7, wherein first and second selectable criteria of the one or more selectable criteria characterize the respective software license restriction as installation-based and usage-based, respectively.

11. The non-transitory computer-readable media claim 7, wherein the one or more selectable criteria are provided in the form of one or more categories selected from the group consisting of:
quantity criteria that control the total number of instances in terms of number;
entity criteria that control the total number of instances in terms of user, location, enterprise, or organization within an enterprise; and
hardware criteria that control the total number of instances in terms of hardware characteristics.

12. The non-transitory computer-readable media claim 7, wherein the logic is further operable to generate a description that summarizes each of the one or more selections of the one or more selectable criteria.

13. The method of claim 1, wherein:
the steps of generating a license metric and determining compliance of the plurality of overlapping licenses are performed in response to a triggering event,
the triggering event comprises adding a new software product to be governed by the plurality of overlapping licenses executed by the licensee, and
the method further includes associating the new software product with the plurality of overlapping licenses executed by the licensee.

14. The method of claim 1, wherein:
the steps of generating the license metric and determining compliance of the plurality of overlapping licenses are performed in response to a triggering event, and
the triggering event comprises disassociating a software product from the plurality of overlapping licensees, the software product no longer governed by the plurality of overlapping licenses executed by the licensee.

15. The method of claim 1, wherein determining if the licensee is in compliance with the plurality of overlapping licenses comprises:
calculating a summation of the number of instances that the software product may be used according to a first executed license and the number of instances that the software product may be used according to a second executed license;
determining that the licensee is in compliance with first and second executed licenses if the total number of instances of use is less than or equal to the summation of the number of instances that the software product may be used according to the first executed license and the number of instances that the software product may be used according to the second executed license; and
determining that the licensee is not in compliance with first and second executed licenses if the total number of instances of use is more than the summation of the number of instances that the software product may be used according to the first executed license and the number of instances that the software product may he used according to the second executed license.

16. The method of claim 1, wherein determining if the licensee is in compliance with the plurality of overlapping licenses comprises:
generating a matrix comprising a plurality of rows and a plurality of columns, wherein each row contains data associated with a selected one of the plurality of executed and overlapping licenses and each column contains represents a respective one of a plurality of software products;
for each column of the matrix, calculating a number of instances that each of the plurality of software products are used by the plurality of client systems associated with the licensee; and
for each of row of the matrix, calculating a total number of instances that the plurality of software products may be used for each of the plurality of executed and overlapping licenses.

17. The method of claim 1, wherein:
presenting one or more selectable criteria comprises presenting a wizard type graphical user interface to the user, the wizard type graphical user interface displaying one or more fill in the blank statements to the user; and
the method further comprises forming a sentence based on the one or more selections of the one or more selectable criteria received from the user, the sentence summarizing the respective software license restriction.

18. The method of claim 1, wherein the one or more selectable criteria comprises a restriction limiting installation of the software product to a set list of a plurality of hardware devices.

19. The method of claim 1, wherein the one or more selectable criteria comprises a restriction limiting use of the software product to a set list of a plurality of users.

20. The non-transitory computer-readable media of claim 7, wherein:
the steps of generating the license metric and determining compliance of the plurality of overlapping licenses are performed in response to a triggering event,
the triggering event comprises adding a new software product to be governed by the plurality of overlapping licenses, and
the logic is further operable when executed to associate the new software product with the plurality of overlapping licenses executed by the licensee.

21. The non-transitory computer-readable media of claim 7, wherein:
the steps of generating the license metric and determining compliance of the plurality of overlapping licenses are performed in response to a triggering event, and
the triggering event comprises disassociating a software product from the plurality of overlapping licenses, the software product no longer governed by the plurality of overlapping licenses executed by the licensee.

22. The non-transitory computer-readable media of claim 7, wherein the logic is operable when executed to determine if the licensee is in compliance with the plurality of overlapping licenses by:
calculating a summation of the number of instances that the software product may be used according to a first executed license and the number of instances that the software product may be used according to a second executed license;
determining that the licensee is in compliance with first and second executed licenses if the total number of instances of use is less than or equal to the summation of the number of instances that the software product may be used according to the first executed license and the number of instances that the software product may be used according to the second executed license; and
determining that the licensee is not in compliance with first and second executed licenses if the total number of instances of use is more than the summation of the number of instances that the software product may be used according to the first executed license and the number of instances that the software product may be used according to the second executed license.

23. The non-transitory computer-readable media of claim 7, wherein the logic is operable when executed to determine if the licensee is in compliance with the plurality of overlapping licenses by:
generating a matrix comprising a plurality of rows and a plurality of columns, wherein each row contains data associated with a selected one of the plurality of executed and overlapping licenses and each column contains represents a respective one of a plurality of software products;

for each column of the matrix, calculating a number of instances that each of the plurality of software products are used by the plurality of client systems associated with the licensee; and for each of row of the matrix, calculating a total number of instances that the plurality of software products may be used for each of the plurality of executed and overlapping licenses.

24. The non-transitory computer-readable media of claim 7, wherein the logic is further operable when executed to:

present one or more selectable criteria by presenting a wizard type graphical user interface to the user, the wizard type graphical user interface displaying one or more fill in the blank statements to the user; and form a sentence based on the one or more selections of the one or more selectable criteria received from the user, the sentence summarizing the respective software license restriction.

25. The non-transitory computer-readable media of claim 7, wherein the one or more selectable criteria comprises a restriction limiting installation of the software product to a set list of a plurality of hardware devices.

26. The non-transitory computer-readable media of claim 1, wherein the one or more selectable criteria comprises a restriction limiting use of the software product to a set list of a plurality of users.

* * * * *